(No Model.)
J. A. DIXON.
APPARATUS FOR SEPARATING GAS FROM LIQUID BY-PRODUCTS.
No. 520,038. Patented May 22, 1894.
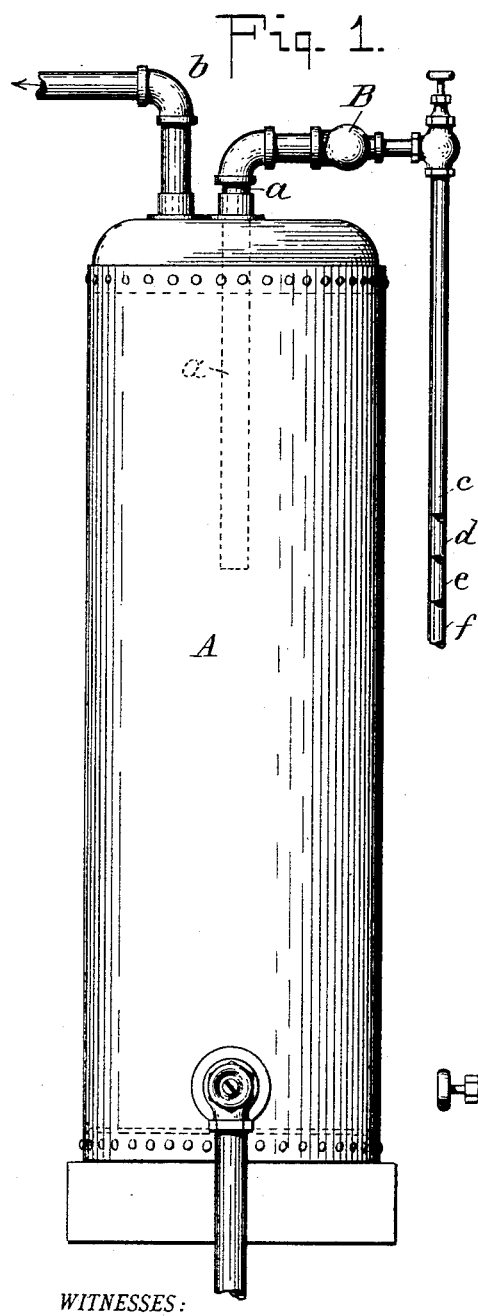
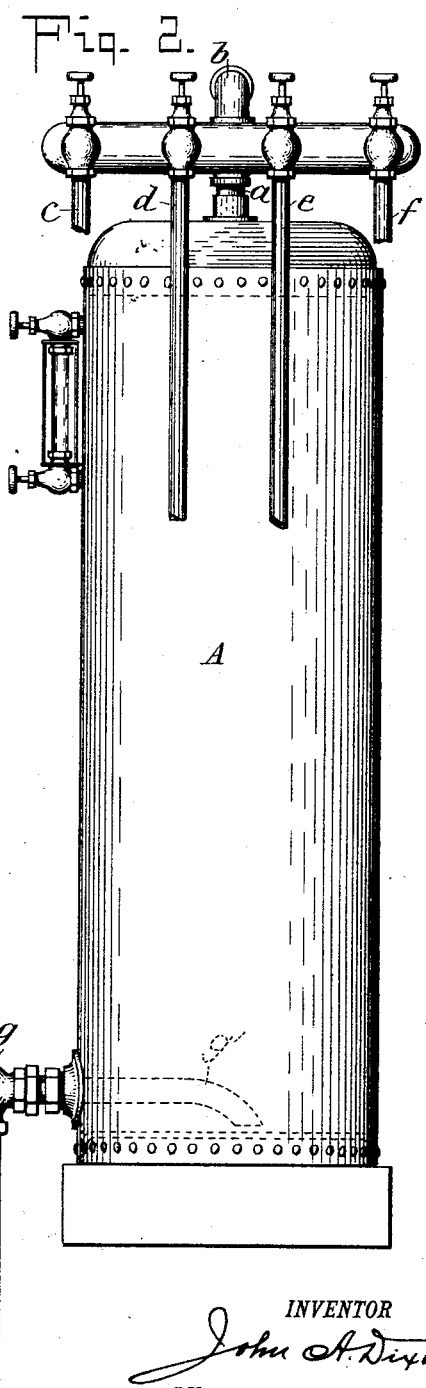
WITNESSES:
INVENTOR
John A. Dixon,
BY Briesen & Knauth
ATTORNEYS.

UNITED STATES PATENT OFFICE.

JOHN A. DIXON, OF EAST ORANGE, NEW JERSEY, ASSIGNOR, BY MESNE ASSIGNMENTS, TO THE SAFETY CAR HEATING AND LIGHTING COMPANY, OF NEW JERSEY.

APPARATUS FOR SEPARATING GAS FROM LIQUID BY-PRODUCTS.

SPECIFICATION forming part of Letters Patent No. 520,038, dated May 22, 1894.

Application filed November 22, 1893. Serial No. 491,610. (No model.)

*To all whom it may concern:*

Be it known that I, JOHN A. DIXON, a resident of East Orange, Essex county, State of New Jersey, have invented a new and useful Apparatus for Separating Gas From its Liquid By-Products, of which the following is a specification.

Figure 1 is an elevation of my apparatus for separating the gas and liquid. Fig. 2 is an elevation of the same taken at right angles to Fig. 1.

My invention relates to apparatus for separating gas from its liquid by-products and has for its object to remove liquid by-products from gas under pressure in a safe, convenient and economical manner, the liquid with its absorbed gas having first been collected in some suitable trap from which it is forced by the gas pressure.

My invention consists in the apparatus described herein, illustrated in the accompanying drawings and more particularly pointed out in the claim.

In the drawings herewith A is a closed vessel preferably a vertical cylinder fitted at its top with an inlet pipe $a$ projecting some distance into the cylinder so as to conduct the gas and liquid well into the cylinder and to prevent the gas passing immediately up through the vertical outlet pipe $b$ and carrying the entrained liquid with it. The inlet pipe $a$ is fitted on its outer end with a manifold fitting B so that any number of traps may be drained by the same apparatus, the pipes $c\ d\ e\ f$ conducting the liquid from the traps which collect the liquid by-products and absorbed gas as they come from the compressors to the inlet pipe $a$. The outlet pipe $b$ is connected with the low pressure storage so that all gas which comes over with the liquid may find easy exit thereto and be re-stored for future use. The vessel A, which may be of light material as its connection with the low pressure storage prevents the accumulation of pressure, is fitted near its top with a gage glass and near its bottom with the draw-off valve $g$ supplied with a curved pipe $g'$ which projects inside the vessel with its inner end below the draining level of the valve so that a trap will be formed to prevent the passage of gas through the pipe $g'$ should the draw-off valve be left open too long. As before stated, the pipes $c\ d\ e\ f$ are connected with traps which collect the liquid by-products with their absorbed gases; so therefore in order to draw the collected liquid from any desired trap, as for instance, the trap to which the pipe $e$ is connected, the valve in the pipe $e$ on the manifold fitting is opened and the liquid in the trap together with an unavoidable amount of gas is forced by the gas pressure into the vessel A. The liquid after falling into the vessel A immediately begins to evolve the gas carried along by it, which gas passes out of the vessel A by the outlet pipe $b$ and is conveyed into the gas holder or low pressure storage. By allowing the liquid to remain quietly in the vessel for a while any gas which was absorbed under pressure is liberated and finds its way to the low pressure storage as described.

Hitherto it has been customary to discharge the by-products of gas manufacture from the collecting traps into open vessels or receptacles. By this practice the gas absorbed or held in solution by the gas tar or other by-products is at once evolved into the atmosphere and gives rise to very objectionable odors.

My apparatus not only makes it possible to save the gas, but avoids the very objectionable odors which accompany the drawing of such liquids in the open air.

Having described my invention, what I claim, and desire to secure by Letters Patent, is—

In an apparatus for separating gas from gas tar, the combination of a vertical closed vessel, a manifold fitting B, a pipe $a$ connected to the manifold fitting by one end and to the top of the vessel, and extending for some distance into and toward the bottom of the vessel, a series of pipes $c\ d\ e\ f$ communicating with the manifold fitting and serving to conduct gas tar into the same from collecting traps, a gas outlet pipe $b$ leading from the top of the closed vessel, and a liquid outlet $g$ at the bottom of the vessel having a curved pipe $g'$ extending into the vessel and terminating below the draining level of the liquid outlet, substantially as described.

JOHN A. DIXON.

Witnesses:
R. M. DIXON,
O. C. GAYLEY.